Nov. 14, 1967  F. W. BAUMANN  3,353,042
VENTILATION FOR TOTALLY ENCLOSED DYNAMOELECTRIC MACHINE
Filed May 19, 1965
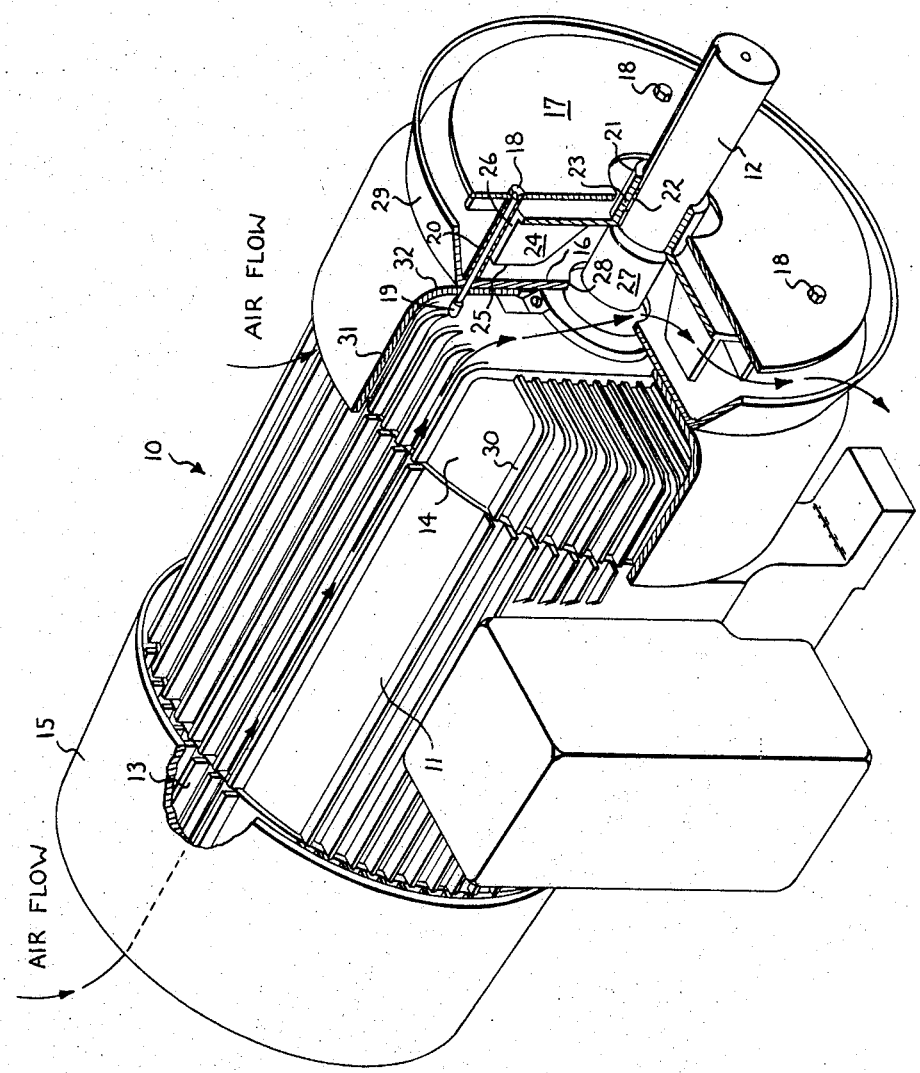
INVENTOR.
FREDERICK W. BAUMANN
BY *James C. Davis Jr.*
HIS ATTORNEY

United States Patent Office 3,353,042
Patented Nov. 14, 1967

3,353,042
VENTILATION FOR TOTALLY ENCLOSED
DYNAMOELECTRIC MACHINE
Frederick W. Baumann, Scotia, N.Y., assignor to General
Electric Company, a corporation of New York
Filed May 19, 1965, Ser. No. 457,025
6 Claims. (Cl. 310—57)

The present invention relates to improved cooling of dynamoelectric machines and especially pertains to such machines of the totally enclosed kind. The invention is equally applicable to electric generators and motors, but in the interest of brevity and clarity, the illustrative embodiment will be confined to the latter.

In certain applications, electric motors are called upon to perform in an inhospitable environment where potentially injurious materials are present, for example, metal chips, abrasive dust, grease and oil. In these applications it is highly desirable, and oftentimes imperative, that the internal components of the motor be isolated from the environment to the extent practicable. Accordingly, motors having imperforate housings are employed, and such machines are known in the art as totally enclosed.

During normal operation of electric motors, heat is generated in the iron and copper components thereof and the heat must be dissipated to the surrounding environment if sustained operation is required and excessively high tempearture is to be avoided. Because the housing for the totally enclosed motor has no ventilation or other openings therethrough, it will be apparent that an external cooling medium cannot be introduced into such machines for the purpose of heat transfer as with most kinds of dynamoelectric machines.

The problem to which the present invention is addressed generally, then, is removal of heat from the external surface of an imperforate motor housing. This problem has been partially solved in the past by providing a totally enclosed fan-cooled motor wherein an externally mounted fan and housing cause cooling air to be drawn in axially adjacent one end of the motor and to be discharged over the longitudinally extending portion of the motor housing, the latter being preferably equipped with integral fins to enhance transfer of heat. While this technique has proved satisfactory for use adjacent the end of the machine which is not attached to an associated apparatus to be electrically driven, difficulties have been experienced in adequately cooling the drive end of the machine. For example, when the drive end of the machine is equipped with integral fins for enhancing heat transfer, the interstices, grooves, etc., between the fins provide a convenient receptacle for dirt, grease and other foreign matter that build up a heat insulating layer which defeats the purpose of the fins and soon causes catastrophic overheating of the drive end of the motor. This difficulty is quite common because the drive end of the motor, in applications requiring a totally enclosed motor, is oftentimes coupled to apparatus which provides the source of such contaminating materials. Also, in many applications there are large pulleys, for example, for V-belts, chains, and the like, that restrict the passageway of air in the vicinity around the portion of the motor through which the shaft projects, or end bell, as it is known in the art.

Accordingly, it is an object of my invention to provide a dynamoelectric machine having a totally enclosed drive end with improved cooling means therefor.

Another object of my invention is to provide a totally enclosed dynamoelectric machine having improved heat transfer means to the surrounding environment at its drive end.

A further object of my invention is to provide readily attachable and detachable auxiliary cooling means for the drive end of an electric motor.

Briefly, in accord with a preferred embodiment of my invention, I provide a dynamoelectric machine having a cup-shaped imperforate end bell at the drive end thereof with integral fins thereon. The fins extend generally radially on the outer wall surface of the end bell and extend axially along the longitudinal surface thereof. A baffle is mounted on the end bell and includes two spaced parallel plates with the inner plate providing with the end bell an air passage over the radially extending fins. A centrifugal fan is mounted on the motor shaft for rotation therewith and includes a shroud adjacent the outer plate that carries blades projecting toward the inner plate in the cavity between the spaced plates. In this way, cooling air is drawn radially inwardly over the axially finned portion of the motor end bell and expelled radially outwardly between the spaced plates in response to shaft rotation in either direction. The forced flow of cooling air serves to readily carry heat away from the end bell and, in addition, provides a scrubbing action which has a cleaning effect on the external finned surface of the end bell. In a further modification, my invention includes a cylindrical housing spaced from and overlying the axially extending fins of the end bell to extend the air intake manifold over these additional surfaces.

The subject matter which I regard as my invention is particularly pointed out and distinctly claimed in the concluding portion of the specification. My invention itself, however, both as to its organization and method of operation, together with further objects and advantages thereof, may best be understood by reference to the following description taken in connection with the accompanying drawing in which:

The figure is a partially sectioned perspective view of a totally enclosed electric motor incorporating the present invention in a preferred form thereof.

Referring now to the drawing in more detail, there is shown a dynamoelectric machine, generally identified by numeral 10, which, for purposes of illustrating a preferred embodiment of the present invention, can be considered as being of a totally enclosed fan-cooled, alternating-current kind of small integral horsepower electric motor. Motor 10 includes a generally cylindrical stator frame 11 which conventionally encloses a laminated core (not shown) having stator winding-receiving axial slots circumferentially spaced around a cylindrical rotor-receiving bore therein and there is a rotor within the bore which electromagnetically cooperates with the core and is supported on a shaft 12 rotatably journaled in saucer-shaped end bells 13 and 14 respectively mounted upon opposite ends of frame 11, all as is well known in the art.

Rotatable shaft 12 projects from the body of motor 10 through one of the end bells, end bell 14 in the drawing, to provide an externally accessible coupling means and this end of the motor is known as the drive end. The opposite drive end of the motor, as it is known, including end bell 13, can include a housing 15 surrounding and spaced from end bell 13. A cooling fluid circulating fan (not shown) is oftentimes mounted within the cavity between housing 15 and end bell 13 on an extension of shaft 12 which is not externally accessible. The cooling fluid is drawn in axially and discharged longitudinally over frame 11 which is preferably finned, as is end bell 13, to enhance heat transfer. While a typical opposite drive end ventilation system has been described, it is to be understood that the present invention pertains to drive end cooling and is not dependent upon any particular opposite drive end configuration.

In accord with my invention, saucer-shaped end bell 14 is imperforate and carries a cooling fluid baffle including spaced parallel plates 16 and 17 mounted on the outboard end of end bell 14. The baffle is conveniently secured to end bell 14 by a plurality of bolts 18 extending through plates 16 and 17 into threaded bolt-receiving integral bosses 19 circumferentially disposed about the periphery of end bell 14. A cylindrical spacer 20 advantageously surrounds each bolt 18 between plates 16 and 17 to provide the desired spacing therebetween. The plates 16 and 17 are generally circular in shape and extend radially outward and are substantially parallel to each other at least out to the peripheral portions thereof which are approximately in register with the outer periphery of the motor frame 11. The space between plates 16 and 17 provides a fan assembly cavity.

The fan assembly advantageously includes a hub 21 secured to shaft 12, as by key 22, for rotation therewith. A generally circular fan plate 23 is carried by hub 21 and is preferably integral therewith. Fan plate 23 is closely spaced, to provide a small running clearance, inwardly of plate 17, which is the outer plate of the baffle comprising plates 16 and 17, and projects radially into the cavity between the aforementioned plates. A plurality of circumferentially spaced centrifugal fan blades 24 project perpendicularly from fan plate 23 toward the outer surface of inner plate 16 within the cavity between plates 16 and 17. The radially extending tips 25 of blades 24 are preferably closely spaced from plate 16 for optimum fan efficiency. The axially extending tips 26 of blades 24 are, of course, spaced radially inward of fixed spacers 20 between the plates 16 and 17 to avoid mechanical interference.

In operation, the embodiment of my invention thus far described causes a forced flow of a cooling medium to be drawn radially inwardly over the end of the end bell 14 and to be discharged radially outwardly from the cavity between plates 16 and 17, in response to rotation of shaft 12 in either direction. The intake passageway is provided by the space between plate 16 and end bell 14. The inlet to the fan assembly is through a passageway bounded on one side by the bearing housing 27 and the radially innermost portion 28 of plate 16 that is spaced radially outward from housing 27.

In the preferred embodiment of my invention, inner plate 16 has an outwardly curved peripheral portion providing an annular air deflector 29 to impart an axial component of discharged cooling fluid velocity away from motor 10. Deflector 29 conveniently extends axially at least as far as plate 17 to provide protection against objects inadvertently coming into mechanical contact with rotating fan blades 24.

Heat transfer from end bell 14 to the cooling fluid medium is increased in efficiency by providing a plurality of integral heat-dissipating fins 30 projecting perpendicularly outward from end bell 14. The fins extend substantially radially on the end of the end bell, that is to say, the fins provide ducts generally in the direction of intended cooling medium flow. While the fins would ideally extend radially outward as spokes in a wheel, it is more economical from a manufacturing viewpoint to cast the fins in parallel groups extending substantially radially, as illustrated. Additional heat exchange efficiency is gained by extending the fins, preferably continuously, up over the curved portion of end bell 14 and longitudinally along the outer peripheral portion of the end bell, as shown. When the latter is done, an auxiliary cylindrical housing 31 is advantageously employed in many applications to extend the air intake manifold over the longitudinal fins. Housing 31 surrounds the longitudinally extending fins in spaced relationship and conveniently includes an inwardly curved lip portion 32 having securing bolt holes therein aligned with bosses 19. In the latter case, bolts 18 can be used to secure housing 31 to end bell 14 axially inward of plate 16, in the manner illustrated in the figure.

The cooling system of my invention permits smaller, less expensive motors to be used in severe applications where the drive end heating of previous motors formerly demanded larger machines. The cooling medium, commonly air, is drawn in radially over the finned surfaces to provide a scrubbing effect. The cooling medium is expelled radially to minimize interference with the driven apparatus, and preferably there is an axial component of expelled cooling medium discharge to further aid in propelling air-borne contaminants, in the vicinity of the drive end, away from the motor. The foregoing is accomplished by adding an assembly to the motor that occupies a desirable minimum of axial space. The cooling assembly is readily detachable (i.e., can be dismantled by removing a few bolts) from the motor when not required and the readily detachable feature permits offering the system as an optional accessory to an otherwise useful line of motors, resulting in economy of manufacturing, warehousing, etc.

It will now be readily apparent that this invention provides an improved cooling system, especially suitable for use at the drive end of a dynamoelectric machine having an imperforate end bell not permitting the use of cooling medium passageways therethrough. In addition, the machine may be economically produced by simple and conventional manufacturing techniques and a maximum abstraction of heat from the machine is effected without the use of expensive component parts while keeping the over-all size of the machine at a minimum.

While I have shown and described a specific embodiment of the present invention, it is to be understood that modifications may be made by those skilled in the art without actually departing from the invention. I therefore aim in the appended claims to cover all such equivalent variations as come within the true spirit and scope of the invention.

What I claim as new and desire to secure by Letters Patent of the United States is:

1. A cooling system for a dynamoelectric machine comprising:
   (a) an imperforate end bell having a rotatable shaft projecting therethrough and a plurality of integral heat-dissipating fins on said end bell projecting outward from said end bell and extending longitudinally relative to said machine on the outer peripheral portion of said end bell and extending substantially radially on the end portion of said end bell;
   (b) a baffle mounted on said end bell including inner and outer spaced parallel plates extending radially outward approximately to the outer circumference of said machine, said inner plate providing an air flow path radially inwardly over said end bell and into the space between said plates; and,
   (c) a fan assembly secured to said shaft for rotation therewith and including a fan plate projecting into said space and carrying a plurality of circumferentially spaced fan blades projecting from said fan plate toward said inner plate, whereby external cooling air is drawn radially inward over said fins and expelled radially outward through said space in response to rotation of said shaft in either direction.

2. The cooling system of claim 1 wherein said inner plate has a curved peripheral portion providing an air deflector to impart an axial component of expelled air velocity away from said machine.

3. The cooling system of claim 1 including a circular housing surrounding at least said longitudinally extending fins to provide an extended air inlet passage over said longitudinally extending fins.

4. The cooling system of claim 1 wherein said shaft projects axially outward beyond said outer plate to provide an externally accessible coupling means.

5. The cooling system of claim 1 wherein said baffle is readily detachably mounted to said end bell and said fan assembly is readily detachably secured to said shaft.

6. A drive end cooling system for a dynamoelectric machine having an imperforate end bell with an externally accessible rotatable shaft journaled within a bearing housing therein and projecting therethrough, said cooling system comprising:
 (a) a plurality of continuous integral heat-dissipating fins on said end bell projecting outward from said end bell and extending longitudinally relative to said machine on the outer peripheral portion of said end bell and extending substantially radially on the end portion of said end bell;
 (b) a baffle mounted on said end bell including inner and outer spaced parallel plates extending radially outward approximately from said bearing housing to the outer circumference of said machine, said inner plate providing an air flow path into the space between said plates adjacent said bearing housing; and,
 (c) a fan assembly secured to said shaft for rotation therewith and including a fan plate projecting into said space and carrying a plurality of circumferentially spaced fan blades projecting from said fan plate toward said inner plate, whereby external cooling air is drawn radially inward over said fins and expelled radially outward through said space in response to rotation of said shaft in either direction.

References Cited
UNITED STATES PATENTS

| | | | |
|---|---|---|---|
| 2,515,973 | 7/1950 | Abbott | 310—57 |
| 2,819,415 | 1/1958 | Waterman | 310—57 |
| 2,909,682 | 10/1959 | Erickson | 310—57 |
| 2,924,729 | 2/1960 | Wren et al. | 310—57 |
| 3,047,752 | 7/1962 | Peterson | 310—57 |

MILTON O. HIRSHFIELD, *Primary Examiner.*

L. L. SMITH, *Assistant Examiner.*